United States Patent
Geile et al.

(10) Patent No.: US 6,467,501 B1
(45) Date of Patent: Oct. 22, 2002

(54) FLUID FLOW CONTROLLER HAVING AXIAL NEEDLE VALVE FOR ADJUSTING THE FLOW RATE

(75) Inventors: Eric A. Geile, Royal Oak, MI (US); Bryan E. Mudge, Redford, MI (US)

(73) Assignee: W. A. Kates Company, Clawson, MI (US)

(*) Notice: Subject to any disclaimer, the term of this patent is extended or adjusted under 35 U.S.C. 154(b) by 0 days.

(21) Appl. No.: 09/825,994

(22) Filed: Apr. 5, 2001

(51) Int. Cl.[7] .................................................. G05D 7/01
(52) U.S. Cl. .................. 137/501; 137/454.5; 137/454.6
(58) Field of Search ............................... 137/501, 454.5, 137/454.6

(56) References Cited

U.S. PATENT DOCUMENTS

| | | | | |
|---|---|---|---|---|
| 2,843,141 A | * | 7/1958 | Arnot et al. .............. | 137/115.1 |
| 3,100,620 A | * | 8/1963 | Kates .......................... | 137/501 |
| 3,223,115 A | * | 12/1965 | Kates .......................... | 137/501 |
| 5,251,655 A | * | 10/1993 | Low ............................ | 137/501 |
| 5,913,328 A | | 6/1999 | Taube et al. ................ | 137/315 |
| 5,931,191 A | | 8/1999 | Taube et al. ................ | 137/594 |
| 5,979,495 A | | 11/1999 | Taube et al. ................ | 137/501 |

* cited by examiner

*Primary Examiner*—Stephen M. Hepperle
(74) *Attorney, Agent, or Firm*—Charles W. Chandler

(57) ABSTRACT

A fluid flow regulator in which fluid is passed through an impeller chamber having a pressure differential-operated impeller piston for monitoring changing inlet and outlet fluid pressures to maintain a constant fluid flow rate. A needle valve mounted on the body at one end of the impeller chamber engages an orifice opening to precisely change the fluid flow rate.

8 Claims, 2 Drawing Sheets

FLUID FLOW CONTROLLER HAVING AXIAL NEEDLE VALVE FOR ADJUSTING THE FLOW RATE

BACKGROUND AND SUMMARY OF THE INVENTION

Fluid flow regulators (controllers) provide a constant flow rate by means of a pressure differential regulating device that senses changes in upstream or downstream fluid pressure and compensates for the change. Conventional regulating devices use an impeller or a piston that is sensitive to a variable incoming fluid pressure, $P_1$, and a downstream fluid pressure, $P_2$. The piston reduces a valve opening when the differential pressure between $P_1$ and $P_2$ increases and enlarges the valve opening when the pressure differential between $P_1$ and $P_2$ is reduced.

Examples of such regulators may be found in U.S. Pat. Nos. 5,931,191 issued Aug. 3, 1999, to Frank A. Taube, John D. Taube, and Peter H. Greverath for "Flow Control Valve for Passing Two Fluids in Opposite Directons"; U.S. Pat. No. 5,913,328 issued Jun. 22, 1999 to John D. Taube, Peter H. Greverath and Eric Geile for "Flow Control Valve with One Piece Plug/Valve Tube Sleeve Assembly"; and U.S. Pat. No. 5,979,495, issued Nov. 9, 1999, to Frank A. Taube and Anthony J. Vizzini for "Adjustable Low Flow High Pressure Regulator". In each case the flow rate of the regulator is adjusted by an adjusting means, such as a needle valve, disposed in a fluid passage that connects incoming fluid pressure $P_1$ on one side of the impeller, to the opposite side of the impeller which is at pressure $P_2$.

The broad purpose of the present invention is to provide an improved fluid flow controller in which the flow rate adjusting valve is mounted on the controller body adjacent one end of the impeller chamber. The piston is balanced by the incoming pressure at $P_1$ acting against one side of the piston, the adjusted fluid pressure $P_2$ biasing the opposite side of the piston, and an impeller spring. The piston moves to either open or close a variable orifice or port connecting the impeller chamber to the outlet opening in response to changes in either the inlet fluid pressure or the outlet fluid pressure.

The preferred controller comprises a minimal number of components that can be easily manufactured.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
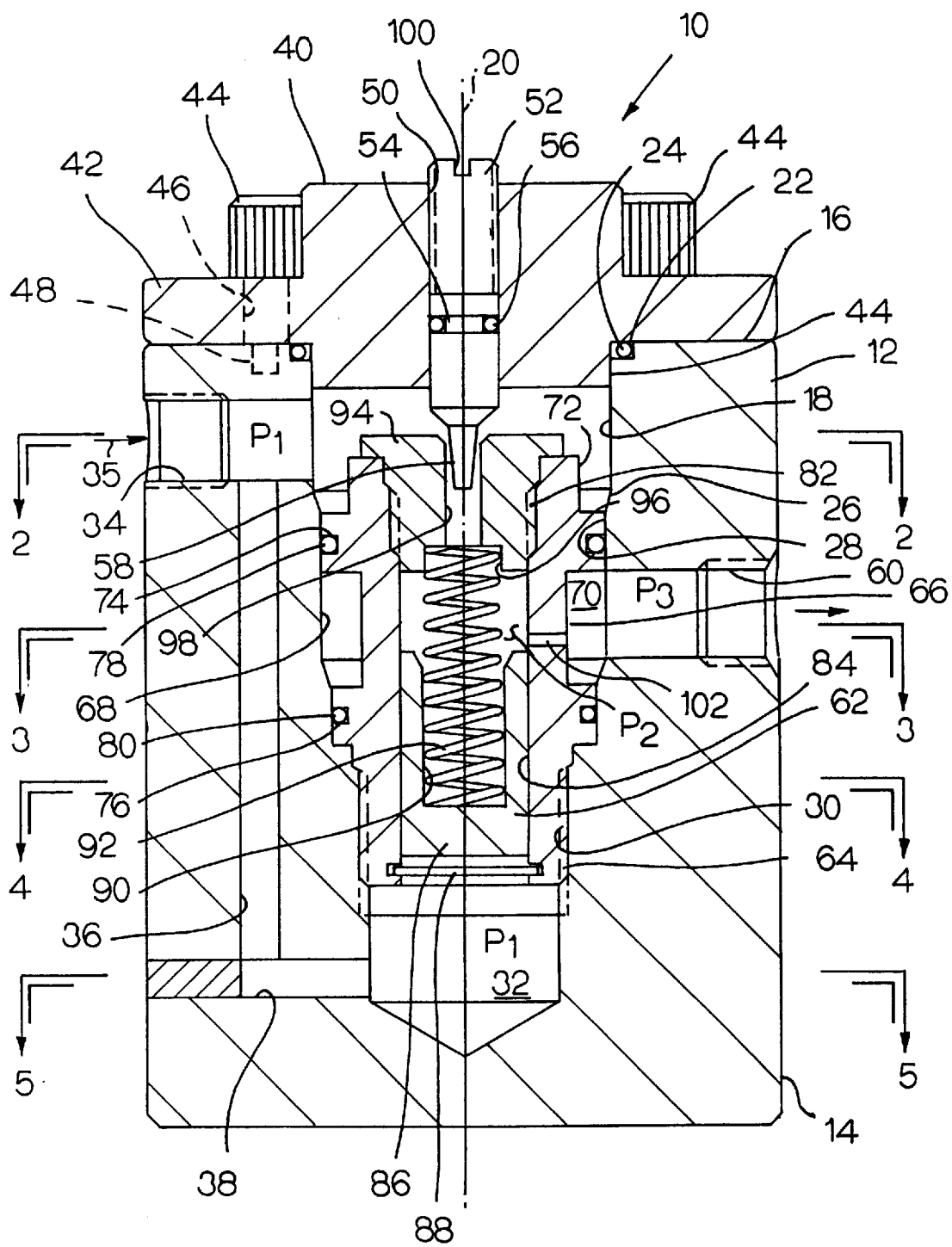
FIG. 1 is a longitudinal sectional view of a fluid flow controller illustrating the preferred embodiment of the invention.
Figure 2:
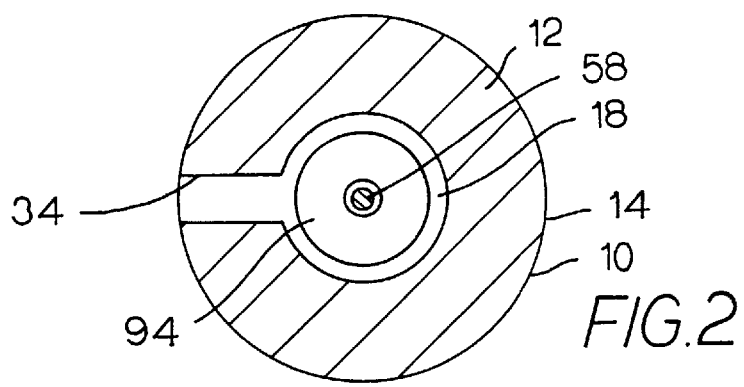
FIG. 2 is a sectional view as seen along lines 2—2 of FIG. 1.
Figure 3:
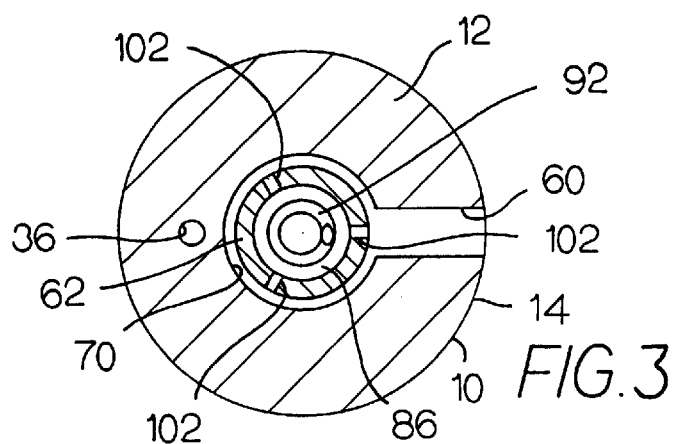
FIG. 3 is a sectional view as seen along lines 3—3 of FIG. 1.
Figure 4:
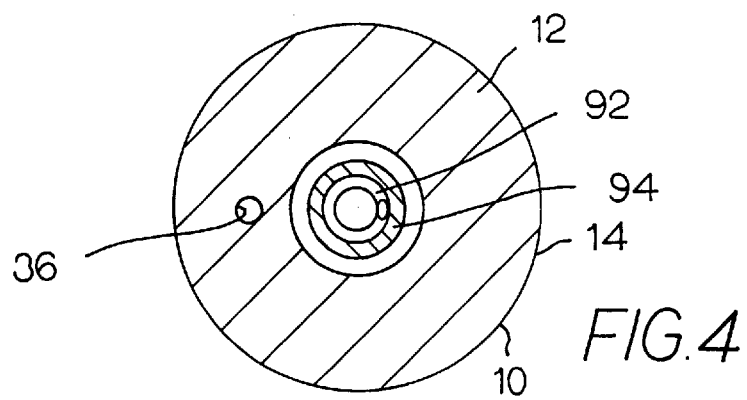
FIG. 4 is a sectional view as seen along lines 4—4 of FIG. 1.
Figure 5:
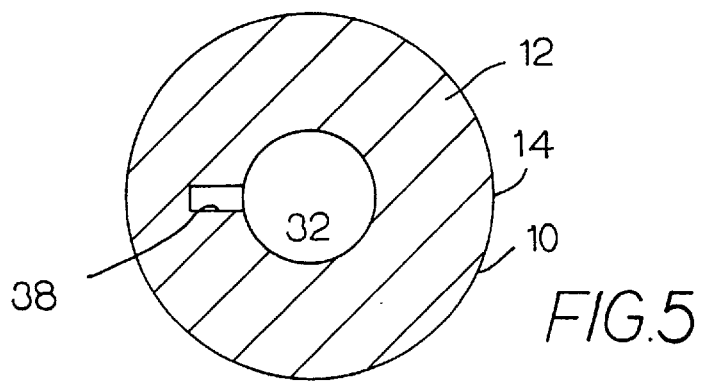
FIG. 5 is a sectional view as seen along lines 5—5 of FIG. 1.

Referring to the drawings, FIG. 1 illustrates a preferred fluid flow controller 10 which comprises a stainless steel body 12 having a cylindrical outer surface 14, and a flat top surface 16.

The controller body has a top cylindrical chamber 18 formed about an axis 20. The upper end of chamber 18, as viewed in FIG. 1, has an annular recess 22 for receiving an O-ring 24. The midsection of chamber 18 is reduced at 26 to form a cylindrical bore 28. The lower part of bore 28 is threaded at 30, and then reduced in diameter to form a cylindrical chamber 32.

Controller body 12 has a lateral inlet opening 34 for receiving incoming fluid in the direction of arrow 35. The inner end of inlet opening 34 is fluidly connected to chamber 18. A longitudinal fluid passage 36 connects inlet opening 34 to a short bottom passage 38 which, in turn, is fluidly connected to chamber 32. Chamber 18, bore 28 and chamber 32 are all formed along axis 20.

A bonnet 40 has an annular flange 42 seated on top surface 16 of the controller body to close the upper end of chamber 18. Bonnet 42 has an inner extension 44 that is slidably received into chamber 18. Bonnet flange 42 is seated on O-ring 24 to form a fluid-tight seal between the controller body and the bonnet flange.

Four socket-head cap screws 44 (only two shown) are each received through a respective opening 46 in the bonnet and a tapped opening 48 in the controller body to tightly fasten the bonnet to the body. The bonnet has internally threaded opening 50 supported along axis 20.

An adjusting needle valve 52 is threadably mounted in threaded opening 50. The unthreaded mid-section of the needle valve has an annular groove 54 receiving an O-ring 56 to form a fluid tight seal between the needle valve and the bonnet. The lower end of the needle valve has a tapered end 58 supported along axis 20 in chamber 18.

The controller body also has a lateral outlet opening 60, which extends into bore 28.

A valve cylinder 62 is removably disposed in bore 28. The lower end of the valve cylinder is threaded at 64 and threadably engaged with threaded bore 30. The valve cylinder has an annular groove 66 which cooperates with cylindrical surface 68 of bore 28 to form an annular passage 70 that is aligned with outlet opening 60.

The upper end of the valve cylinder, as viewed in FIG. 1, has a hexagonal configuration 72 for mating with a socket wrench (not shown) for tightening the valve cylinder in the controller body. The valve cylinder also has a pair of annular grooves 74 and 76 disposed on opposite sides of passage 70 for supporting a pair of O-rings 78 and 80. The O-rings form a fluid tight seal between the controller body and the valve cylinder on opposite sides of passage 70.

The valve cylinder is sized so that it can be passed through chamber 18 for either removal from or insertion into the controller body.

The valve cylinder has an upper internal threaded bore 82, and a smaller cylindrical impeller chamber 84. A pressure-sensitive metal piston 86 is slidably mounted in impeller chamber 84 for motion toward a lower position in which the piston abuts an annular retaining spring 88. The piston has an internal axial bore 90 with a lower blind end for seating the lower end of a compression spring 92.

An orifice plug 94 is threadably mounted in threaded bore 82 of the valve cylinder. The orifice plug has an inner recess 96 seating the upper end of the compression spring. Plug 94 has a central orifice 98 sized to receive tapered end 58 of the needle valve. The tapered end of the needle valve is adjusted with respect to orifice 98 by inserting a tool (not shown) into valve slot 100 to precisely adjust the size of the fluid passage through orifice 98, thereby adjusting the rate of fluid flow from chamber 18 into impeller chamber 84, between the fixed orifice plug and the movable piston.

Three lateral port means 102 in the valve cylinder fluidly connect impeller chamber 84 to annular passage 70. The piston is chosen with a length such that when it is raised from its seated position on spring 88, it partially obstructs ports 102 to form three variable sized orifice openings.

OPERATION

In operation, fluid at pressure $P_1$ enters inlet opening 34 from a conduit and a suitable fitting, not shown. The fluid passes downwardly through passage 36, through passage 38 into chamber 32. The incoming fluid also passes into chamber 18 at pressure $P_1$, through the fixed, adjusted orifice passage defined between the needle valve and orifice 98 into impeller chamber 84, reduced to pressure $P_2$.

Thus, piston 86 is exposed to a pressure differential between fluid pressure $P_2$ in the low pressure side of the piston, and pressure $P_1$ on the high-pressure side of the piston. The fluid pressure is then reduced as it passes through port means 102 to outlet pressure $P_3$. The location of the piston in the impeller chamber is a function of the differential pressure on the high $P_1$ and low $P_2$ pressure sides of the piston and the bias of spring 92.

The controller does not, however, operate independently of varying outlet pressures $P_3$ that may exist downstream of port means 102. Flow through the impeller chamber is a function of differential pressure. If pressure $P_3$ increases, the flow rate through ports 102 decreases, thereby increasing pressure $P_2$ and creating an imbalance on the piston. The piston moves downwardly, increasing the size of ports 102, and increasing flow through orifice 98, and returning stability to the flow rate.

If inlet pressure $P_1$ acting on the high pressure side of the piston in chamber 32 increases, the piston rises against the compression spring to change the flow rate through ports 102 to maintain the fluid flow according to the adjusted size of the flow passage through orifice 98. If incoming fluid at pressure $P_1$ is reduced, the piston moves downwardly under the bias of compression spring 92 thereby opening port means 102 a sufficient amount to restore the outlet flow rate.

When the piston is in a stable condition, pressure $P_2$ plus the bias of spring 92 equals pressure $P_1$. Any change in pressures $P_1$ or $P_3$ causes a change in the pressure differential thereby causing the piston to automatically move to a position returning stability and a constant flow rate through the controller.

Having described our invention, we claim:

1. A constant fluid flow controller, comprising:
   a body with an internal chamber, an inlet opening for receiving fluid under pressure at $P_1$ into said chamber, an outlet opening for discharging fluid from said chamber;
   valve means disposed in the body for passing fluid from the inlet opening to the outlet opening including;
   a valve cylinder disposed in said internal chamber, the valve cylinder having an impeller chamber having a first end and a second end, aligned along a bore axis;
   a piston movable in the impeller chamber along the bore axis;
   passage means in the body for fluidly connecting the inlet opening to the first end of the impeller chamber to fluidly bias the piston in a first axial direction;
   an orifice plug disposed in the second end of the valve cylinder, said orifice plug having an orifice opening for passing fluid therethrough from the inlet opening to the impeller chamber to fluidly bias the piston in the opposite axial direction;
   a spring disposed between the orifice plug and the piston in the impeller chamber to bias the piston in said opposite axial direction;
   a flow control port in the valve cylinder for passing fluid received through the orifice opening into the impeller chamber as pressure $P_2$;
   a needle valve mounted on the body adjacent the orifice opening, the needle valve having an end movably disposed along said bore axis in the orifice opening for precisely adjusting the size of a fluid passage through the orifice opening and thereby the flow rate through the controller body;
   the piston being disposed between the inlet fluid pressure $P_1$ and fluid pressure $P_2$ either to open or to close the flow control port to maintain the fluid flow rate therethrough equal to a desired flow, in which $P_1=P_2+$ the bias of the spring on the piston, over a substantial range of inlet fluid pressures; and
   the orifice plug being threadably mounted in the valve cylinder to define a portion of the impeller chamber.

2. A constant fluid flow controller, comprising:
   a body with an internal chamber, an inlet opening for receiving fluid under pressure at $P_1$ into said chamber, an outlet opening for discharging fluid from said chamber;
   valve means disposed in the body for passing fluid from the inlet opening to the outlet opening including:
   a valve cylinder disposed in said internal chamber, the valve cylinder having an impeller chamber having a first end and a second end, aligned along a bore axis;
   a piston movable in the impeller chamber along the bore axis;
   passage means in the body for fluidly connecting the inlet opening to the first end of the impeller chamber to fluidly bias the piston in a first axial direction;
   an orifice plug disposed in the second end of the valve cylinder, said orifice plug having an orifice opening for passing fluid therethrough from the inlet opening to the impeller chamber to fluidly bias the piston in the opposite axial direction;
   a spring disposed between the orifice plug and piston in the impeller chamber to bias the piston in said opposite axial direction;
   a flow control port in the valve cylinder for passing fluid received through the orifice opening in the impeller chamber at pressure $P_2$;
   a needle valve mounted on the body adjacent the orifice opening, the needle valve having an end movably disposed along said bore axis in the orifice opening for precisely adjusting the size of a fluid passage through the orifice opening and thereby the flow rate through the controller body;
   the piston being disposed between the inlet fluid pressure $P_1$ and the fluid pressure $P_2$ either to open or to close the flow control port to maintain the fluid flow rate therethrough equal to a desired flow, in which $P_1=P_2+$ the bias of the spring on the piston, over a substantial range of inlet fluid pressures;
   the body having a bonnet opening, and including a bonnet removably mounted on the bonnet opening, the bonnet having a needle valve opening aligned with said bore axis, the needle valve being threadably mounted in the needle valve opening so as to be adjustably movable with respect to the orifice opening to adjust the size of said fluid passage;

the valve cylinder having an annular groove cooperating with the internal chamber wall to form an annular passage around the valve cylinder in fluid communication with the outlet opening; and including at least a pair of O-rings disposed between the valve cylinder and the wall of the internal chamber, and axially spaced on opposite sides of the annular passage.

3. A fluid flow controller as defined in claim 1, in which the body has a bonnet opening, and including a bonnet removably mounted on the bonnet opening, the bonnet having a needle valve opening aligned with said bore axis, the needle valve being threadably mounted in the needle valve opening so as to be adjustably moveable with respect to the orifice opening to adjust the size of said fluid passage.

4. A fluid flow controller as defined in claim 3, in which the bonnet opening is sized to permit removal of the valve cylinder therethrough from the internal chamber.

5. A fluid flow controller as defined in claim 4, in which the valve cylinder is threadably mounted in the body.

6. A fluid flow controller as defined in claim 3, in which the valve cylinder has an annular groove cooperating with the internal chamber wall to form an annular passage around the valve cylinder in fluid communication with the outlet opening.

7. A fluid flow controller as defined in claim 1, in which the inlet opening is disposed in a lateral direction with respect to the bore axis.

8. A fluid flow controller as defined in claim 1, in which the outlet opening is disposed in a lateral direction with respect to the bore axis.

* * * * *